(12) United States Patent
Rölleke

(10) Patent No.: US 8,725,710 B2
(45) Date of Patent: May 13, 2014

(54) RANKING OF RECORDS IN A RELATIONAL DATABASE

(75) Inventor: Thomas Rölleke, Little Dunmow (GB)

(73) Assignee: Queen Mary & Westfield College, London (GB)

( * ) Notice: Subject to any disclaimer, the term of this patent is extended or adjusted under 35 U.S.C. 154(b) by 1896 days.

(21) Appl. No.: 10/573,272

(22) PCT Filed: Sep. 21, 2004

(86) PCT No.: PCT/GB2004/050013
§ 371 (c)(1),
(2), (4) Date: Sep. 21, 2006

(87) PCT Pub. No.: WO2005/031604
PCT Pub. Date: Apr. 7, 2005

(65) Prior Publication Data
US 2007/0043755 A1    Feb. 22, 2007

(30) Foreign Application Priority Data
Sep. 24, 2003   (GB) .................................. 0322328.6

(51) Int. Cl.
*G06F 17/30*   (2006.01)

(52) U.S. Cl.
USPC ........... 707/706; 707/709; 707/790; 707/813; 707/821; 707/608

(58) Field of Classification Search
USPC ...................... 707/3, 608, 709, 790, 813, 821
See application file for complete search history.

(56) References Cited

U.S. PATENT DOCUMENTS

| | | | |
|---|---|---|---|
| 2002/0103793 A1* | 8/2002 | Koller et al. | 707/3 |
| 2002/0138478 A1 | 9/2002 | Schwartz et al. | |
| 2004/0111410 A1* | 6/2004 | Burgoon et al. | 707/4 |

FOREIGN PATENT DOCUMENTS

WO    WO 2005/031604    4/2005

OTHER PUBLICATIONS

Roelleke, et al., "The Accessibility Dimension for Structured Document Retrieval", Lectures Notes In Computer Science, pp. 284-302, vol. 2291 Mar. 25, 2002.
Roelleke, et al., "hy_pra—HySpirit Probabilistic Relational Algebra" Internet Article, Feb. 28, 2002.
R Cavallo, et al., "The Theory of Probabilistic Databases", Proceedings of the 13$^{th}$ International Conference on Very Large Database, pp. 7-81,1987, State of University of New York College of Technology, Utica, New York.
M Pittarelli, IEEE Transactions on Knowledge and Data Engineering, "An Algebra for Probabilistic Database", pp. 293-303, vol. 6 No. 2 Apr. 1994.
T Rolleke, HySpirit : Layers of HySpirit, Available from http://www.hysprit.com, Jan. 29, 2004.
Dey D, et al., Data Knowledge and Engineering, "PSQL: A Query Language for Probabilistic Relational Data" pp. 107-120, vol. 28, 1998.
R Beltrame, APL Quote Quad, "An Extension of Relational Database Model to Probabilistic Data", pp. 17-24, vol. 14, Jun. 1984, USA.

(Continued)

*Primary Examiner* — Sana Al Hashemi
(74) *Attorney, Agent, or Firm* — Patterson & Sheridan, L.L.P.

(57) ABSTRACT

A method for generating a probabilistic relational database based on a previous relational database, wherein the probability estimation is carried out within the relational paradigm. The method may include frequency-based and information theoretic based (idf-based) estimation of tuple probabilities. The method generalises the use of information retrieval ranking methods such that these and new ranking methods are available for relational databases.

3 Claims, 1 Drawing Sheet

Independence

Disjointness

Inclusion

(56) References Cited

OTHER PUBLICATIONS

L V S Lakshmanan, ACM Transactions on Database Systems, Association for Computing Machinery, "ProbView: A Flexible Probabilistic Database System", pp. 419-469, vol. 22, New York, 1997.

International Search Report, Application No. PCT/GB2004/050013, Dated Mar. 9, 2005.
Search Report, Application No. GB 0322328.6, Dated Mar. 18, 2004.
International Preliminary Report on Patentability, Application No. PCT/GB2004/050013, Dated Nov. 14, 2005.

\* cited by examiner

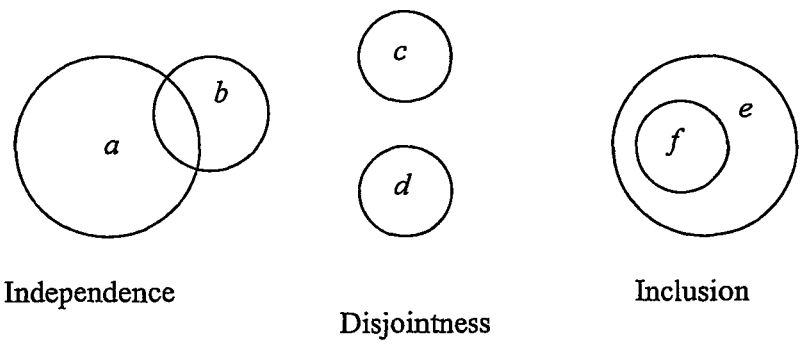

RANKING OF RECORDS IN A RELATIONAL DATABASE

This invention relates to the ranking of records in a relational database. In particular, although not exclusively, it relates to a method of integrating the ranking of search terms and documents with relational database technology.

Information retrieval technology and research is driven by the relevance-based ranking of retrieved objects. Since the usage of search engines is now a daily business, the ranking principle is well known.

In the past, database technology and research has not really been concerned with ranking. The focus has generally been on data modelling, query languages, security, transactions, and other issues.

The drawback in information retrieval technology is the lack of a logical data model for implementing information retrieval. For database technology, query languages (known as SQL, OQL, XQL) and their associated paradigms (relational model, object-oriented model and XML) form logical layers. In particular, the well-defined relational algebra, which forms the basis of SQL, has led to the success and wide use of database technology.

Relational algebra now forms one of the pillars of database technology. However, from an information retrieval point of view, relational algebra lacks relevance-based ranking of retrieved objects. Therefore, researchers have defined probabilistic extensions for relational algebra to meet the requirements of information retrieval and management of uncertain data in general. The approaches used concentrate on the aggregation of probabilities. Estimation of probabilities is not integrated into relational algebra.

The ranking frequencies in information retrieval are based on frequencies: the most famous are term frequency, inverse document frequency, and link frequency.

The term frequency (tf) reflects the dominance of a term (word) in a document. A simple definition of the term frequency of a term (t) in a document d is based on the maximum occurrence $n(t_{max}, d)$.

$$tf(t, d) := \frac{n(t, d)}{n(t_{max}, d)}$$

The term frequency is 1.0 for the term with the maximal occurrence. For all other terms, the frequency is less than 1.0.

The inverse document frequency (idf) reflects the discriminating power of a term in a collection. A term which occurs in few documents is a good query term, since it leads to a few documents being uncovered, whereas a term which occurs in many documents leads to a large list which is not helpful to the searcher. With $n(t)/N$ being the fraction of documents in which the term t occurs, the idf is defined as follows:

$$idf(t) := -\log \frac{n(t)}{N}$$

The idf is 0 for $n(t)=N$, i.e. a term that occurs in all documents. For $n(t)<N$, the idf increases logarithmically, i.e. the idf is infinitely large for a term that occurs in very few documents $(n(t)<<N)$ in large collections $(N \to \infty)$.

There is a need for a method of integrating the ranking of search terms and documents with relational database technology. There is a further need for a method of estimating probabilities within the framework of a relational database.

In accordance with a first aspect of the present invention there is provided a method of generating a probabilistic relational database, comprising identifying a list of records in a relational database, and assigning a probability to each record within the relational paradigm.

Each record may comprise one or more attribute values. The probability assigned to a record may then be calculated on the basis of the frequency of occurrence of an attribute value contained in that record. In order to provide probabilities that provide selectivity, the probability assigned to a record is preferably low if the frequency of an attribute value contained in that record is high, and high if the frequency of an attribute value contained in that record is low.

In accordance with a second aspect of the present invention there is provided a method of generating a probabilistic relational database, comprising:
  identifying a list of records in a relational database, each record containing first and second attribute values;
  identifying all the second attribute values found in the list of records; and
  assigning a probability to each first attribute value on the basis of the frequency of its occurrence relative to each second attribute value.

The probabilities for the first attribute values may be normalised so that the highest probability is 1, or alternatively so that the sum of the probabilities is 1.

The probabilities of the first attribute values are preferably assigned so as to maximise their selectivity. In other words, a first attribute value that occurs linked to only a few second attribute values will have a high probability. Preferably, the probability for each first attribute value is proportional to the inverse document frequency of that attribute value relative to the second attribute values. The inverse document frequency of a first attribute value may be defined as the logarithm of the total number of second attribute values divided by the number of second attribute values contained in records also containing the first attribute value.

In one embodiment, each second attribute value refers to a document and each first attribute value refers to a term found in a document, and the inverse document frequency of a term is defined as the logarithm of the total number of documents divided by the number of documents containing that term. However, it will be appreciated that other embodiments are possible and the invention is not limited to records of "documents" containing "terms". For example, the relational database may be a datawarehouse.

As an alternative, the probabilities may be assigned to maximise their frequencies. In this case, the probabilities for the first attribute values may be normalised so that, for each possible second attribute value, the highest probability of a first attribute value given that second attribute value is 1. Alternatively, the normalisation may be such that, for each possible second attribute value, the sum of the probabilities of first attribute values is 1.

For frequency-based probability estimation, for each second attribute value, the probability for each first attribute value may be proportional to the number of times that first attribute value occurs given that second attribute value divided by the total number of first attribute values contained in a record having that second attribute value.

The present invention also provides a method of ranking search terms in a relational database, comprising determining the probability of each search term corresponding to a record or attribute value as described above, and ranking the search terms on the basis of the probabilities of the search terms. A relational database comprising search terms ranked using such a method is also provided, as is a method of retrieving data from such a database.

In accordance with a preferred embodiment of the present invention, there is provided a method of integrating the ranking of search terms and documents with relational database technology, comprising:

identifying a list of search terms;
identifying a list of documents containing the search terms; and determining a probability for each search term on the basis of the frequency of its occurrence in each document.

In accordance with a third aspect of the present invention, there is provided a method for estimating a probabilistic relational database based on a previous relational database, comprising assigning frequency-based and information-theory-based probabilities to the tuples of the relations contained in the previous relational database. The frequency based probabilities may be created by max and sum norms as hereinafter defined. The information-theory-based probabilities are preferably created by max_idf and sum_idf norms as hereinafter defined.

The assignment of probabilities is preferably performed using a relational algebra operator of the form BAYES{norm}[attribute-list](relational-algebra-expression) as hereinafter defined. The relational algebra operator preferably determines the probability of each attribute value in a hypothesis key, given an evidence key comprising the set of attributes specified in the attribute list of the relational algebra operator.

In a preferred embodiment, the hypothesis key may comprise a set of terms contained in documents, the evidence key comprising the set of documents containing said terms. In an alternative embodiment, the evidence key may comprise a set of terms contained in documents, the hypothesis key comprising the set of documents containing said terms.

The invention also provides a method of ranking tuples in a relational database, comprising estimating the probabilities of tuples using the method described above and ranking the tuples on the basis of the estimated probabilities.

It will be appreciated that many users will not wish to use relational algebra directly to access records in a database. Many modern databases are accessed using Structured Query Language (SQL). SQL may be amended to provide suitable clauses to instruct a database engine to carry out the required relational algebra operators. In accordance with a fourth aspect of the present invention there is provided a method of retrieving data from a relational database, comprising: applying a relational algebra operator to data in the database to determine the probability of each attribute value in a hypothesis key, given an evidence key; and outputting a list of attribute values with associated probabilities to a user. Preferably the user requests data retrieval using SQL.

Thus the present invention allows the creation of a probabilistic relational algebra (PRA), which is a powerful candidate for modelling information retrieval. On one hand, the relational model meets the demands of effective data modelling, and, on the other hand, the probabilistic extension meets the demands of modelling the intrinsic uncertainty of knowledge which leads to a degree of relevance for retrieved objects. The high level of integration of database and retrieval technology coming with PRA opens the door for the effective development of flexible search applications, since database technology (relational model, etc) becomes "applicable" for retrieval experts and retrieval technology (tf-idf, etc) becomes "applicable" for database experts.

Standard (non-probabilistic) relational algebra together with SQL increased the effectiveness and flexibility of software engineering. Probabilistic relational algebra, together with a search interface, will increase the effectiveness and flexibility of development of information retrieval applications. In particular, the development of applications such as structured and hypermedia document retrieval, multi-lingual retrieval, and knowledge (fact) retrieval benefit from a logical model such as probabilistic relational algebra, since such applications require the modelling and combination of several knowledge dimensions. The classical knowledge dimension of term-document occurrence can be combined with knowledge dimensions such as links between document nodes, structure of documents, relationships between terms, semantics of words, etc. Also, classical database applications such as datawarehousing, footprint databases, data fusion, and new applications in knowledge management take advantage from uncertainty management, since the data cleansing and merging processes do not need to be sharp anymore. The combination of the knowledge dimensions involved can be described with relational operations.

With previously known relational algebra, whereas it proved possible to describe, design and develop complex and flexible retrieval functions efficiently, the probability estimation, which was not part of the algebra, took much effort and did not prove flexible. The "outside" nature of the probability estimation was therefore viewed as a shortcoming of the algebra, in particular when compared with the neatness of the probability aggregation associated with the five basic relational operations. The application of probabilistic relational algebra overcomes these problems.

Some preferred embodiments of the invention will now be described by way of example only and with reference to the accompanying drawings, in which:

FIG. 1 illustrates the difference between assumptions of independence, disjointness and inclusion.

Probabilistic Relational Algebra

In this section, probabilistic relational algebra is defined. The five basic relational operators are defined with reference to an example. Consider the probabilistic relation "term-doc" for associating terms and documents.

| term-doc | |
|---|---|
| P (τ) | τ |
| 0.9 | (sailing, doc_1) |
| 0.8 | (ocean, doc_1) |
| 0.7 | (boats, doc_1) |
| 0.6 | (sailing, doc_2) |
| 0.5 | (boats, doc_2) |
| 0.9 | (sailing, doc_3) |
| 0.8 | (blue, doc_4) |
| 0.7 | (ocean, doc_5) |
| 0.6 | (sailing, doc_5) |

A probabilistic relation such as "term-doc" is a list (term-doc, (T, P)), where the first element, term-doc, is the name of the relation, and the second element, (T, P), is the instance of the relation. T is a set of tuples. For term-doc, this gives: T={(sailing, doc_1), (ocean, doc_1), ... }. P is a probability function T→[0 . . . 1]. For term-doc, this gives: P((sailing, doc_1))=0.9, P((ocean, doc_1))=0.8, . . . .

A tuple is considered as a function τ: {1, 2, ... }→D, where {1, 2, ... } is the set of column (attribute) numbers and D is the set (domain) of attribute values. For example, let $\tau_1$ be the first tuple of "term-doc", then we obtain: $\tau_1[1]$=sailing and $\tau_1[2]$=doc_1.

A probabilistic relation is considered as a relational algebra expression (RAE). In the following, the five basic operators for manipulating probabilistic relations are defined and illustrated.

Definition 1 Selection: Select [ϕ](RAE) is a RAE, where ϕ is the Selection Condition.

Syntactically, ϕ is a condition such as, for example, $1=sailing. Semantically, ϕ is a function T→{true, false} where T is a set of tuples. Let $(T_a, P_a)$ be a probabilistic relation on which a selection is applied, and let (T,P) be the result of the operation.

$$\text{Select}[\varphi]((T_a, P_a)) := (T, P)$$
$$T := \{\tau \mid P(\tau) > 0\}$$
$$P(\tau) := \begin{cases} P_a(\varphi), & \text{if } \tau \in T_a \wedge \varphi(\tau) \\ 0, & \text{otherwise} \end{cases}$$

For example, the selection of the tuples where the first column is equal to "sailing", yields:

| Select[$1 = sailing](term-doc) | |
|---|---|
| 0.9 | (sailing, doc_1) |
| 0.6 | (sailing, doc_2) |
| 0.9 | (sailing, doc_3) |
| 0.6 | (sailing, doc_5) |

The selection operation does not combine (aggregate) the probabilities. The remaining operations (projection, join, union, and subtraction) may aggregate probabilities from two (join, union, subtraction) or more (projection) tuples. The present discussion is limited to a selection that applies a sharp condition, i.e. an extended form of the selection would consider a vague condition match and manipulate the probabilities in the result relation accordingly.

For the aggregation of probabilities, the three assumptions known from set, probability and fuzzy theory are considered:

| assumption | abbreviation |
|---|---|
| independent | ind |
| disjoint | dis |
| included | fuzz |

FIG. 1 illustrates these assumptions. Events a and b are independent, i. e. $P(a \vee b)=1-(1-P(a))\cdot(1-P(b))$ and $P(a \wedge b)=P(a)\cdot P(b)$. Events c and d are disjoint (exclusive), i.e. $P(c \vee d)=P(c)+P(d)$ and $P(c \wedge d)=0$. Event e includes f, i.e $P(e \vee f)=P(e)$ and $P(e \wedge f)=P(f)$.

Definition 2 Projection: Project$_{assum}$ [L](RAE) is a RAE, where L is the Projection List and is One of the Three Assumptions.

Syntactically, L is a list of column indicators, for example, $1, $2. Semantically, L is a list $i_1, \ldots, i_n$ where $i_j$ are column (attribute) numbers.
Project$_{assum}[i_1, \ldots, i_n]((T_a,P_a)):=(T,P)$
$T:=\{(\tau[i_1], \ldots, \tau[i_n])|\tau \in T_a\}$
$P(\tau):=P_a(\tau_1 \vee \ldots \vee \tau_m)$, $\tau_1 \in T_a \wedge \tau_1[i_1 \ldots i_n]=\tau[1 \ldots n] \wedge \ldots \wedge$
$\tau_m \in T_a \wedge \tau_n[i_1 \ldots i_n]=\tau[1 \ldots n]$ Let m be the number of tuples with equal attribute values in the attributes of the projection list i e. m tuples coincide because the projection makes them non-distinct.

| assum | $P_a(\tau_1 \vee \ldots \vee \tau_m)$ |
|---|---|
| ind | $1 - \Pi_{k=1 \ldots m}(1 - P_a(\tau_k))$ |
| dis | $\Sigma_{k=1 \ldots m} P_a(\tau_k)$ |
| fuzz | $\max(\{P_a(\tau_k) \mid k = 1 \ldots m\})$ |

With assumption "disjoint", the sum of probabilities should be less or equal 1.0 for a correct probabilistic model. This is not automatically guaranteed by specifying the assumption. Here, the knowledge engineer who is using a PRA must be aware of the interchange between probability values and assumption.

For illustrating the projection on "term-doc", an inclusion assumption is applied. Consider the RAE Project$_{fuzz}$[$2] (term-doc). This gives a projection list with one column (n−1, $i_1$=2), and obtains T={(τ[2])|τ ∈ $T_a$}={(doc_1), . . . ,(doc_)}. For the tuple (doc1), three tuples coincide (m=3): P((doc_1))=$P_a(\tau_1 \vee \tau_2 \vee \tau_3)$=max({$P_a(\tau_1)$, . . . }), where $\tau_1$=(sailing, doc_1), $\tau_2$=(ocean,doc_1), and $\tau_3$=(boats,doc_1).

| Project$_{fuzz}$[$2](term-doc) | |
|---|---|
| 0.9 | (doc_1) |
| 0.6 | (doc_2) |
| 0.9 | (doc_3) |
| 0.8 | (doc_4) |
| 0.7 | (doc_5) |

The projection with an independence and disjointness assumptions will be illustrated later.

Definition 3 Join: Join$_{assum}$(RAE, RAE) is a RAE.
Join$_{assum}((T_a,P_a), (T_b,P_b)):=(T,P)$
$T:=\{(\tau_a[1 \ldots n], \tau_b[1 \ldots m])|\tau_a \in T_a \wedge \tau_b \in T_b 1\}$
$P(\tau):=P(\tau_a[1 \ldots n], \tau_b[1 \ldots m])), \tau_a \in T_a \wedge \tau_b \in T_b$

| assum | $P((\tau_a[1 \ldots n], \tau_b[1 \ldots m]))$ |
|---|---|
| ind | $P_a(\tau_a) \cdot P_b(\tau_b)$ |
| dis | 0 |
| fuzz | $\min(\{P_a(\tau_a), P_b(\tau_b)\})$ |

The assumption "disjoint" is not useful for Join, since P(τ) would be equal to 0 for all tuples of the result of the Join.

As conventional with relational algebra, the following composition is used:

$$\text{Join}_{assum}[\phi](RAE,RAE):=\text{Select}[\phi](\text{Join}_{assum}(RAE, RAE))$$

For an illustration of Join, a retrieval function in which documents are retrieved according to the disjunction of query terms can be modelled. The relation "query-term" is joined with the relation "term-doc", then a projection on the document identifier is performed. All tuples are considered as independent.

| query-term | |
|---|---|
| 0.8 | sailing |
| 1.0 | boats | q_t_d = Join$_{ind}$[$2 = $1](query-term, term-doc)

| | |
|---|---|
| 0.72 = 0.8 · 0.9 | (sailing, sailing, doc_1) |
| 0.70 = 1.0 · 0.7 | (boats, boats, doc_1) |
| 0.48 = 0.8 · 0.6 | (sailing, sailing, doc_2) |
| 0.50 = 1.0 · 0.5 | (boats, boats, doc_2) |
| 0.72 = 0.8 · 0.9 | (sailing, sailing, doc_3) |
| 0.48 = 0.8 · 0.6 | (sailing, sailing, doc_5) |

Project$_{ind}$[$3](q_t_d)

| | |
|---|---|
| 0.916 = 0.72 + 0.70 − 0.72 · 0.70 | (doc_1) |
| 0.740 = 0.48 + 0.50 − 0.48 · 0.50 | (doc_2) |
| 0.72 | (doc_3) |
| 0.48 | (doc_5) |

In the projection, the tuples with the same document identifier coincide and we obtain a ranking of retrieved documents is obtained. The projection computes the probabilities according to the disjunction of independent events, $P(\tau_1 \vee \tau_2) = P(\tau_1) + P(\tau_2) − P(\tau_1) \cdot P(\tau_2) = 1 − (1 − P(\tau_1)) \cdot (1 − P(\tau_2))$.

For completeness, the definitions of Unite and Subtract are provided

Definition 4 Union: Unite$_{assum}$(RAE, RAE) is a RAE.
Unite$_{assum}$(($T_a,P_a$), ($T_b,P_b$)) := (T,P)
$T := \{\tau \mid \tau \in T_a \vee \tau \in T_b\}$

| assum | P($\tau$) |
|---|---|
| ind | $P_a(\tau) + P_b(\tau) − P_a(\tau) \cdot P_b(\tau) = 1 − (1 − P_a(\tau)) \cdot (1 − P_b(\tau))$ |
| dis | $P_a(\tau) + P_b(\tau)$ |
| fuzz | $\max(\{P_a(\tau), P_b(\tau)\})$ |

Definition 5 Subtraction: Subtract$_{assum}$(RAE, RAE) is a RAE.
Subtract$_{assum}$(($T_a,P_a$), ($T_b,P_b$)) := (T,P)
$T := \{\tau \mid \tau \in T_a\}$

| assum | P($\tau$) |
|---|---|
| ind | $P_a(\tau) \cdot (1 − P_b(\tau))$ |
| dis | $P_a(\tau)$ |
| fuzz | 0, if $P_a(\tau) \leq P_b(\tau)$ |
| | $P_a(\tau) \cdot (1 − P_b(\tau))$, otherwise |

The PRA has now been defined.

Information Retrieval

As an example of the application of PRA in information retrieval (IR), consider the modelling of a retrieval strategy based on the relation "term-doc", a relation "qterm" of query terms, and a relation "termspace" of terms in the collection, where the latter relation could be interpreted as a user representation.

| qterm | | termspace | |
|---|---|---|---|
| 0.5 | (sailing) | 0.2 | (sailing) |
| 0.5 | (essex) | 0.6 | (boats) |
| | | 1.0 | (essex) |
| | | 1.0 | (ocean) |

The probabilities in relation "qterm" reflect the importance of a term in a query, and the probabilities in relation "termspace" reflect the discriminative power of a term (sailing occurs in less documents than boats, or, with respect to a user modelling, sailing is more important than boats). The retrieval strategy becomes:

wqterm=Project$_{dis}$[$1](Join$_{ind}$[$1=$1](qterm, termspace))

retrieve=Project$_{dis}$[$3](Join$_{ind}$[$1=$1](wqterm,term-doc))

The weighted query term relation "wqterm" reflects the importance of the query terms for the query formulation (i.e. how dominant is a term among the query terms) and for the user (i.e. how powerful is a term in distinguishing between relevant and non-relevant documents).

| wqterm | |
|---|---|
| 0.1 | (sailing) |
| 0.5 | (essex) |

A document in which both terms occur and where both terms represent the content of the document with a probability of 1.0 would be retrieved with a retrieval status value of 0.6. A query in which only maximal discriminative terms occur (for example, "essex" and "ocean") would retrieve those documents with 1.0 in which all query terms occur with a probability of 1.0.

The probabilities in the relations "qterm" and "term-doc" are based on the term frequency (how dominant is a term) and the probabilities in "termspace" are based on the inverse document frequency (how discriminative is a term in the sense that it discriminates relevant and not relevant documents). With this interpretation, the above relational algebra expressions model the widely used tf•idf approach.

The use of PRA in IR has now been introduced. System developers and researchers who applied PRA were convinced by the flexibility in probability aggregation, but a frequently asked question was: where do the initial probabilities come from? In the next section the incorporation of the estimation of probabilities into PRA is described.

Probability Estimation with Relational Bayes

The discussion is started with an illustration of the algebraic steps that lead to an idf-based relation "termspace", a relation used for modelling relevance-based retrieval. In the "termspace" relation, we find the probabilities that a term is discriminative (informative).

Inverse Document Frequency

As described in the introduction, the inverse document frequency idf(t) of a term t in a collection is one of the main parameters for ranking retrieved documents. The idf is defined as follows:

$N_D$: Number of documents $n_D(t)$: Number of documents in which term t occurs $$idf(t) := \log \frac{N_D}{n_D(t)}, \quad idf(t) = -\log \frac{n_D}{N_D}$$

The aim is to describe an idf-based probability estimation in a probabilistic relational algebra. The starting point is a relation "term-doc-binary". The probabilities in a binary relation are either 1.0 or 0.0.

| term-doc-binary | |
|---|---|
| 1.0 | (sailing, doc_1) |
| 1.0 | (ocean, doc_1) |
| 1.0 | (boats, doc_1) |
| 1.0 | (sailing, doc_2) |
| 1.0 | (boats, doc_2) |
| 1.0 | (sailing, doc_3) |
| 1.0 | (blue, doc_4) |
| 1.0 | (ocean, doc_5) |
| 1.0 | (sailing, doc_5) |

We are looking for a sequence of algebra operations that leads to a probabilistic relation of terms in which the probabilities bear idf nature, i.e. the probabilities are high for rare terms, and the probabilities are low for frequent terms.

We start with a projection for obtaining the document space.

| doc = Project$_{ind}$[$2](term-doc-binary) | |
|---|---|
| 1.0 | (doc_1) |
| 1.0 | (doc_2) |
| 1.0 | (doc_3) |
| 1.0 | (doc_4) |
| 1.0 | (doc_5) |

Next, we generate a new relation from "doc" such that the probability function assigns the probability 1/5 (1 /number of documents) to each document. Let $(T_a,P_a)$ denote the instance of relation "doc", and let P denote the probability function of the new relation.

$$P_{sum}(\tau) := \frac{P_a(\tau)}{\text{sum}(\{P_a(\tau') \mid \tau' \in T_a\})} \quad (1)$$

This operation, division of a probability by a sum of probabilities, shows similarities with the theorem of Bayes as will be shown below. For the moment, let Bayes$_{sum}$[] be the operation that assigns to each tuple the fraction of the tuple probability and the sum of all probabilities.

| doc-space = Bayes$_{sum}$[ ](doc) | |
|---|---|
| 0.2 | (doc_1) |
| 0.2 | (doc_2) |
| 0.2 | (doc_3) |
| 0.2 | (doc_4) |
| 0.2 | (doc_5) |

The idea is to join the relation "term-doc-binary" with the relation "doc-space" and sum the probabilities of the tuples that are equal in the first column (the first column contains the term). Consider the join and the disjoint projection.

| term-doc-space = Join$_{ind}$[$2 = $1](term-doc-binary, doc-space) | |
|---|---|
| 0.2 | (sailing, doc_1, doc_1) |
| 0.2 | (ocean, doc_1, doc_1) |
| 0.2 | (boats, doc_1, doc_1) |
| 0.2 | (sailing, doc_2, doc_2) |
| 0.2 | (boats, doc_2, doc_2) |
| 0.2 | (sailing, doc_3, doc_3) |
| 0.2 | (blue, doc_4, doc_4) |
| 0.2 | (ocean, doc_5, doc_5) |
| 0.2 | (sailing, doc_5, doc_5) |
| df-term = Project$_{dis}$[$1](term-doc-space) | |
| 0.8 | (sailing) |
| 0.4 | (ocean) |
| 0.4 | (boats) |
| 0.2 | (blue) |

The disjoint projection forms the sum over the probabilities of the coinciding tuples. We have reached the probabilistic relation "df-term" which reflects the document frequency of terms. Term "sailing" occurs in 4 of 5 documents, "ocean" and "boats" occur in 2 of 5 documents, and "blue" occurs in 1 of 5 documents.

Before continuing with the idf, consider the summary of the four relational operations used for obtaining the df-term.

doc=Project$_{ind}$[$2](term-doc-binary)

doc-space=Bayes$_{sum}$[ ](doc)

term-doc-space=Join$_{ind}$[$2=$1](term-doc-binary, doc-space)

df-term=Project$_{dis}$[$1](term-doc-space)

The idf-value of a tuple r can be computed from the probability of the tuple. Let $P_a$ be the probability function of relation "df-term".

$$idf(\tau) = -\log P_a(\tau)$$

Given the idf-value of a tuple, a normalisation is required for obtaining probability values. For the normalisation, the sum of idf-values or the maximal idf-value is chosen. The sum of idf-values yields a distribution of probabilities that adds up to 1.0, an estimate useful for working with a space of disjoint terms. The maximal idf-value yields a distribution of probabilities that assigns 1.0 to the terms with the minimum occurrence, an estimate useful for working with a space of independent terms.

These normalisations are referred to as "sum_idf" and "max_idf", respectively. Consider the definition of the respective probability functions:

$$P_{\text{sum\_idf}}(\tau) := \frac{idf(\tau)}{\text{sum}(\{idf(\tau') \mid \tau' \in T_a\})} \quad (2)$$

$$P_{\text{max\_idf}}(\tau) := \frac{idf(\tau)}{\max(\{idf(\tau') \mid \tau' \in T_a\})} \quad (3)$$

The two definitions differ from equation 1: In equation 1, nominator and denominator are probabilities, now, for sum_idf and max_idf, nominator and denominator are idf-values that quantify the information of a tuple. Still, the operation is comparable: A function value of a tuple is normalised by the maximal value or the summation. Because of this similarity, we can again use the relational Bayes for expressing a probability estimation based on the idf.

Let Bayes$_{sum\_idf}$[ ] be the operation that assigns to each tuple the fraction of the idf-value of the tuple and the sum of all idf-values. Consider the values and illustration of the probability values for sum_idf.

| Bayes$_{sum\_idf}$[ ](df-term) | |
|---|---|
| 0.06 | (sailing) |
| 0.25 | (ocean) |
| 0.25 | (boats) |
| 0.44 | (blue) |

$$\text{idf}_{sum} = -\log(0.8 \cdot 0.4 \cdot 0.4 \cdot 0.2) = 1.592$$
$$0.06 = -\log(0.8)/\text{idf}_{sum}$$
$$0.25 = -\log(0.4)/\text{idf}_{sum}$$
$$0.25 = -\log(0.4)/\text{idf}_{sum}$$
$$0.44 = -\log(0.2)/\text{idf}_{sum}$$

Let Bayes$_{max\_idf}$[ ] be the operation that assigns to each tuple the fraction of the idf-value of the tuple and the maximum of all idf-values. Consider the values and illustration of the probability values for max_idf.

| Bayes$_{max\_idf}$[ ] (df-term) | |
|---|---|
| 0.14 | (sailing) |
| 0.57 | (ocean) |
| 0.57 | (boats) |
| 1.00 | (blue) |

$$\text{idf}_{max} = -\log(0.2)$$
$$0.14 = -\log(0.8)/\text{idf}_{max}$$
$$0.57 = -\log(0.4)/\text{idf}_{max}$$
$$0.57 = -\log(0.4)/\text{idf}_{max}$$
$$1.00 = -\log(0.2)/\text{idf}_{max}$$

We have arrived at probabilistic relations of terms where the probability estimations are based on the idf-values of terms. In addition to the five standard operations of the relational algebra, we used the Bayes operation, so far, with three norms: sum, sum_idf, and max_idf.

Now the relational Bayes is defined formally.

The Relational Bayes

In this section, we look at the theorem of Bayes, the notion of evidence key and hypothesis key of the relational Bayes, and the definition of the relational Bayes.

Theorem of Bayes

Bayes' theorem is $$P(h|e) = \frac{P(h \wedge e)}{P(e)} = \frac{P(e|h) \cdot P(h)}{P(e)}$$

where the conditional probability P(h|e) of a hypothesis h given evidence e is equal to the fraction of the probability of the conjunction of hypothesis and evidence, and the total probability P(e) of the evidence. Given a set of disjoint events h' with $\Sigma_{h'} \cdot P(h')=1.0$, we can use the theorem of the total probability for computing P(e).

$$P(e) = \sum_{h'} P(e|h') \cdot P(h)$$

Bayes' theorem becomes:

$$P(h|e) = \frac{P(e|h') \cdot P(h)}{\sum_{h'} P(e|h') \cdot P(h)}$$

If we have a probabilistic relation, in which the probability function corresponds to P(e ∧ h), then we specify in the relational Bayes the attributes for which the tuples are assumed to be disjoint. A Bayes$_{sum}$[key](relation) operation implements then the theorem of Bayes.

The key (column list) in the relational Bayes operation is the list of attributes that are used for calculating the denominator P(e), i. e. the total probability of the evidence.

Therefore, we refer to this key as evidence key, and we refer to the complement of the evidence key as the hypothesis key.

Evidence Key and Hypothesis Key

For an illustration of the notion evidence key and hypothesis key, consider an example in which we compute the probability P(t|d), i. e. the probability that term t is true given document d.

term_doc=Bayes$_{sum}$[$2](term-doc-binary)

The result of the operation is shown below.

| term_doc = Bayes$_{sum}$[$2](term-doc-binary) | |
|---|---|
| P(t|d) | (t, d) |
| 0.33 | (sailing, doc_1) |
| 0.33 | (ocean, doc_1) |
| 0.33 | (boats, doc_1) |
| 0.50 | (sailing, doc_2) |
| 0.50 | (boats, doc_2) |
| 1.00 | (sailing, doc_3) |
| 1.00 | (blue, doc_4) |
| 0.50 | (ocean, doc_5) |
| 0.50 | (sailing, doc_5) |

The evidence key contains the second column, the document, and is specified as a parameter of the Bayes$_{sum}$ operation. The specification of the evidence key shows similarity to the column list in a projection. As will be explained later, a projection is an inner operation used by Bayes for computing the evidence probability. Different from a projection, Bayes does not remove any columns.

The probability $P_{sum}(\tau)$ for the case that the evidence key contains the second column is defined as follows (let ($T_a, P_a$) be the instance of relation "term-doc-binary"):

$$P_{sum}(\tau) := \frac{P_a(\tau)}{\text{sum}(\{P_a(\tau') | \tau' \in T_a \wedge \tau'[2] = \tau[2]\})}$$

The sum of the probabilities of the tuples that are equal in the second attribute value (the evidence key) forms the denominator.

Looking at the definition, it will be noticed that the denominator, the evidence probability, becomes greater than 1.0. This theoretical "misfit" can be explained as follows.

A relation "term-AND-doc" with semantics P(t ∧ d) is obtained if a relation with semantics P(t|d) is joined with a relation with semantics P(d). Relation "term_doc" from above has the semantics P(t|d) and relation "doc-space" has the semantics P(d). We form:

term-AND-doc=Project[$1,$2](Join$_{ind}$[$2=$1](term_doc, doc-space))

The application of $Bayes_{sum}[\$2]$ to "term-AND-doc" is from probabilistic point of view now justified, since the tuples with the same attribute value in column 2 of relation "term-AND-doc" are disjoint. The usage of a document space makes explicit that it is possible to work here with a more elaborated document space than an equiprobable space of document events. For example, taking document length or a measure of document importance into account would lead to the desired document normalisation in the estimation of $P(t|d)$.

Definition of Bayes

Consider now the formal definition of the relational operator Bayes.

Definition 6 Bayes: $Bayes_{norm}[L](RAE)$ is a RAE, where L is a list of attribute columns.

The set of attribute columns in L is called the evidence key of the Bayes operation.

Let A be the set of attributes of tile RAE being the argument of Bayes, then, the set "A—evidence key" is called the hypothesis key of the Bayes operation.

$Bayes_{norm}[i_1, \ldots, i_n]((T_a, P_a)) := (T_a, P)$

Bayes leaves the set of tuples unchanged.

The probability function $P(\tau)$ of a Bayes instantiation is defined as follows:

$$\text{sum} \quad \frac{P_a(\tau)}{\text{sum}(\{P_a(\tau')|\tau' \in T_a \wedge \tau'[i_1 \ldots i_n] = \tau[i_1 \ldots i_n]\})}$$

$$\text{max} \quad \frac{P_a(\tau)}{\text{max}(\{P_a(\tau')|\tau' \in T_a \wedge \tau'[i_1 \ldots i_n] = \tau[i_1 \ldots i_n]\})}$$

$$\text{sum\_idf} \quad \frac{idf(\tau)}{\text{sum}(\{P_a(\tau')|\tau' \in T_a \wedge \tau'[i_1 \ldots i_n] = \tau[i_1 \ldots i_n]\})}$$

$$\text{max\_idf} \quad \frac{idf(\tau)}{\text{max}(\{P_a(\tau')|\tau' \in T_a \wedge \tau'[i_1 \ldots i_n] = \tau[i_1 \ldots i_n]\})}$$

For a discussion of the definition, we consider in the following extreme cases. First, we look at the case of an empty evidence key, and second, at the case of an evidence key that contains all attributes of a relation.

For an empty evidence key, all tuples of the argument relation are considered in the sum or max expressions, respectively. Thus, we obtain for the sum norm with an empty evidence key:

$$P_{sum}(\tau) = \frac{P_a(\tau)}{\text{sum}(\{P_a(\tau')|\tau' \in T_a\})}$$

For an evidence key that contains all columns, each tuple of the result relation obtains the probability 1.0.

$$P_{sum}(\tau) = \frac{P_a(\tau)}{\text{sum}(\{P_a(\tau')|\tau' \in T_a \wedge \tau' = \tau\})}$$

$$= \frac{P_a(\tau)}{P_a(\tau)}$$

$$= 1.0$$

The max norm is analogous.

Next, consider the extreme cases for which the denominators of the probability definitions lead to a division by zero.

1. The sum and max norms lead to a division by zero, if no evidence tuple with a probability greater than 0 exists.

2. The sum_idf and max_idf norms lead to a division by zero, if no evidence tuple with a probability greater than 0 exists or if all evidence tuples have a probability of 1.0.

From an information theory point of view, the sum and max norms do not work if there is no evidence, and the sum_idf and max_idf norms do not work if there is no information in the sense that all tuples that coincide for an evidence key have a probability of 1.0.

As a final example, consider the computation of $P(d|t)$ based on the relation "term-doc-binary" introduced earlier. $P(d|t)$ can be computed in a manner analogous to the computation of $P(d|t)$.

| doc_term = $Bayes_{sum}[\$1]$(term-doc-binary) | |
|---|---|
| $P(d|t)$ | (t, d) |
| 0.25 | (sailing, doc_1) |
| 0.50 | (ocean, doc_1) |
| 0.50 | (boats, doc_1) |
| 0.25 | (sailing, doc_2) |
| 0.50 | (boats, doc_2) |
| 0.25 | (sailing, doc_3) |
| 1.00 | (blue, doc_4) |
| 0.50 | (ocean, doc_5) |
| 0.25 | (sailing, doc_5) |

The tuple (sailing, doc_1) receives the probability 0.25, since "sailing" occurs in four documents. The probability $P(d|t)$ has idf-character (large probabilities for non-frequent terms, small probabilities for frequent terms). A projection with assumption included preserves the idf-character.

| $Project_{included}[\ ]$(doc_term) | |
|---|---|
| P(t) | (t) |
| 0.25 | (sailing) |
| 0.50 | (ocean) |
| 0.50 | (boats) |
| 1.00 | (blue) |

The probabilities lack the logarithmic scaling of the idf-based probability estimation. However, the discussion shows the duality of the Bayes operation: it is possible to derive term and document spaces, and apply logarithmic scaling to the term space as well as to the document space. It is this expressiveness and flexibility that makes the potential of the relational Bayes for information system development.

So far, the idf-based probability estimation and the formal definition of the relational Bayes have been considered. Distinct tuples have always been assumed. Next, the discussion is extended towards the term frequency where the term frequency requires to deal with non-distinct tuples.

Term Frequency of a Term in a Document

As described earlier, the term frequency $tf(t, d)$ of a term t in a document d is defined as the fraction of the occurrence of term t in document d and the maximum occurrence of all terms in a document.

$n(t,d)$: Occurrence of term t in document d $n(t_{max},d)$: Max occurrence in document d $$tf(t, d) := \frac{n(t, d)}{n(t_{max}, d)}$$

Basically, we could assume a relation "term-pos" in which we associate terms (t) and positions (p).

| term-pos | |
|---|---|
| 1.0 | (sailing, 42) |
| 1.0 | (sailing, 4711) |
| 1.0 | (sailing, 13) |
| 1.0 | (ocean, 10) |
| 1.0 | (boats, 1) |
| 1.0 | (boats, 17) |

With the Bayes$_{sum}$ operation, we assign to each tuple the fraction of the probability of the tuple and the maximum of the probabilities of the tuples for one document.

| term-pos = Bayes$_{sum}$[ ](term-pos) | |
|---|---|
| P(t∧p) | (t, p) |
| 0.167 | (sailing, 42) |
| 0.167 | (sailing, 4711) |
| 0.167 | (sailing, 13) |
| 0.167 | (ocean, 10) |
| 0.167 | (boats, 1) |
| 0.167 | (boats, 17) |

With a disjoint projection, we add the probabilities of each term.

| term = Project$_{dis}$[$1](term-pos) | |
|---|---|
| P(t) | (t) |
| 0.500 | (sailing) |
| 0.167 | (ocean) |
| 0.333 | (boats) |

The result of the disjoint projection reflects the term frequency (position frequency) of a term in a document. An attached Bayes with max norm lifts the probabilities such that the most frequent term represents the document with probability 1.0.

| term = Bayes$_{max}$[ ](term) | |
|---|---|
| 1.00 | (sailing) |
| 0.67 | (boats) |
| 0.33 | (ocean) |

The above discussion assumes that we have a document-specific relation "term-pos" in which terms and positions are associated. This is often not the case. Instead, we often have only a non-distinct relation "term-doc", i.e. the position is not encoded, only the so-called within-document frequency is reflected by non-distinct tuples. Consider a "term-doc" relation with non-distinct tuples:

| term-doc (non-distinct) | |
|---|---|
| 1.0 | (sailing, doc_1) |
| 1.0 | (ocean, doc_1) |

-continued

| term-doc (non-distinct) | |
|---|---|
| 1.0 | (sailing, doc_1) |
| 1.0 | (boats, doc_1) |
| 1.0 | (sailing, doc_2) |

Analogue to the creation of a document space for the inverse document frequency, we create a space for computing the term frequency, this time a "nil" space that contains no attribute. The following algebraic steps are analogue to the creation of relation df-term.

nil=Project$_{ind}$[ ](term-doc)
nil-space=Bayes$_{sum}$[ ](nil)
term-doc-space=Join$_{ind}$[ ](term-doc, nil-space)
tf-term=Project$_{dis}$[$1,$2](term-doc-space)

We obtain:

| tf-term | |
|---|---|
| 0.4 | (sailing, doc_1) |
| 0.2 | (ocean, doc_1) |
| 0.2 | (boats, doc_1) |
| 0.2 | (sailing, doc_2) |

The application of Bayes with the max norm yields the desired result.

| tf-term - Bayes$_{max}$[$2](tf-term) | |
|---|---|
| 1.0 | (sailing, doc_1) |
| 0.5 | (ocean, doc_1) |
| 0.5 | (boats, doc_1) |
| 1.0 | (sailing, doc_2) |

We have shown that the relational Bayes is suitable for estimating idf-based and tf-based probabilities. Next, we look briefly at the exploitation of link frequencies as used in web retrieval.

Link Frequency

For hypermedia (hypertext and multimedia) retrieval and structured document retrieval, the incorporation of links into the retrieval strategy is crucial. Consider a relation "link" for reflecting a link structure among documents. Let the link:s model the logical structures of two documents: doc_1 with two sections and doc_2 with three sections.

| link | |
|---|---|
| P(d∧s) | (d, s) |
| 1.0 | (doc_1, sec_11) |
| 1.0 | (doc_1, sec_12) |
| 1.0 | (doc_2, sec_21) |
| 1.0 | (doc_2, sec_22) |
| 1.0 | (doc_2, sec_23) |

The task is to estimate for each document a probability that is inversely proportional to the number of sections. The motivation of this estimation is to use such probability for deriving the content of a document from its sections. The more sections, the less is the contribution of a particular section.

The Bayes$_{sum}$ operation is applied on the first column, the document, so to consider the document as evidence and compute the probability P(s|d) that a section s occurs in a document d.

| sec_doc = Bayes$_{sum}$[$1](link) | |
|---|---|
| P(s\|d) | (d, s) |
| 0.50 | (doc_1, sec_11) |
| 0.50 | (doc_1, sec_12) |
| 0.33 | (doc_2, sec_21) |
| 0.33 | (doc_2, sec_22) |
| 0.33 | (doc_2, sec_23) |

We obtain the relation "sec_doc" (semantics P(sec|doc)) in which probabilities are high for document-section pairs if the document has few sections, and probabilities are low for document-section pairs if the document has many sections.

The join operation augmented-term-doc=Project[$1,$3](Join[$2=$2](sec_doc, term-doc))

created the augmented index of parent documents. This uncertain propagation of the section content proved to be an effective way for solving retrieval tasks involving structured documents.

Bayes Norms and Probabilistic Assumptions

For the five basic operations, we distinguish three assumptions, whereas for Bayes, we distinguish four norms. We relate in this section the assumptions and the norms.

First, consider that the relational Bayes is based on a projection operation. The relational Bayes uses a projection on the evidence key to compute the evidence probabilities. For the sum and max norm, the projection assumptions are disjoint and included, respectively.

For the idf-norms, the properties of the logarithm are exploited. For sum_idf, the sum of the negative logarithms forms the denominator. Therefore, the inner projection of Bayes forms the product over the tuple probabilities that coincide in the projection.

$$-\log P(\tau_1)+-\log P(\tau_2)=-\log(P(\tau_1) \cdot P(\tau_2))$$

For max_idf, the maximum of the negative logarithms forms the denominator. Therefore, the inner projection forms the minimum over the tuple probabilities.

$$\max(\{-\log P(\tau_1), -\log P(\tau_2)\})=-\log \min(\{P(\tau_1), P(\tau_2)\})$$

After this consideration, we associate the information-theoretic sum_idf norm with an independence assumption for the events of the probability space. A summation of amounts of information ($-\log P(t)$ is considered as the amount of information carried by t) corresponds to a conjunction of independent events. The information-theoretic max_idf norm is associated with an inclusion assumption for the events of the probability space. The max operation on amounts of information corresponds to a conjunction of included events. The relationship between norms and assumptions is summarized in the following table:

| Bayes norm | Probabilistic assumption (inner projection) |
|---|---|
| sum | disjunction of disjoint events |
| max | disjunction of included events |
| sum_idf | conjunction of independent events |
| max_idf | conjunction of included events |

Next, we look at the independence assumption. Consider the computation of the probability of n coinciding tuples (see definition of the Project operator):

$$P(\tau_1 \vee \ldots \vee \tau_n) = 1 - P(\neg\,(\tau_1 \vee \ldots \vee \tau_n))$$
$$= 1 - P(\neg\,\tau_1 \vee \ldots \vee \neg\,\tau_n))$$
$$= 1 - (1 - P(\tau_1)) \cdot \ldots \cdot (1 - P(\tau_n))$$

Based on DeMorgan, the probability computation involves the multiplication of the complement probabilities of the tuple probabilities. This computation for independent events shows an interesting property for the case that we work with a space of events where each event is true with a probability of 1/n, where n is the number of events. We obtain such a probability space by applying Bayes$_{sum}$[key] to a relation; n is the number of tuples with the same evidence key value. The probability of the disjunction of independent events converges towards $1-e^{-1}$ (follows from $\lim_{n \to \infty}(1+x/n)^n = e^x$). More generally, the disjunction of independent events converges towards $1-e^{-\lambda}$ for a single event probability $\lambda/n$. The probability $1-e^{-\lambda}$ is the Poisson probability that a single event occurs at least once. The further discussion of the information-theoretic impact of Poisson and the independence assumption is beyond the scope of this paper about the relational Bayes.

The name "idf" used for Bayes norms pays contribution to the widely used idf-approach in information retrieval. In this document a more general notion has been defined: an "inverse tuple frequency" has been defined, since for the relational Bayes operation the meaning of the attributes does not matter. Thus, we gain the information-theoretic measure of "amount of information" for tuples in a relation. This is an achievement for retrieval and database technology, since a central piece of information theory is now part of the probabilistic relational paradigm.

Now, the estimation of dual parameters, for example, the inverse term frequency of a document (small documents obtain high probabilities, large documents obtain small probabilities) can be implemented efficiently. Such document characteristics can be used for retrieving relevant terms for a number of documents (the terms are retrieved, the documents form the query). For example, applications such as multilingual retrieval and summarisation (select sentences with relevant terms) gain from dual parameters. Also, the logarithmic scaling can be applied to any other information such as links, document structure, document length, etc. Retrieval applications do not need to implement frequency-based and information-theoretic probability estimation any more, since the functionality is available on the logical layer of probabilistic relational modelling.

Implementation

The algebraic implementation of the relational Bayes is based on a projection operation on the argument relation followed by a loop over the tuples of the argument relation. Assuming an index on the argument relation, the computation of each evidence probability has a linear complexity O(n) where n is the average number of tuples that coincide because the projection makes them non-distinct. With N being the number of distinct tuples in the result of the projection, it is necessary to compute N evidence probabilities; thus, the complexity of the probabilistic projection is O(N·n). For each tuple of the argument relation, a division of the tuple probability and evidence probability is performed. With m being the number of tuples in the argument relation, the complexity of Bayes is O(m)+O(N·n), i.e. the complexity is quadratic for the number of evidence key values (N) and the average number of tuples that coincide.

For large data sources, the algebraic steps for a tf-idf-based probability estimation and the algebraic implementation of the relation Bayes can be made more efficient. The efficient implementation is based on the transformation of probabilistic relations to so-called "frequentistic" relations, where frequentistic relations host frequencies of attribute values. Based on those frequencies, the norms of Bayes are computed. The implementation based on frequency-based relations bears also advantages when performing probability estimation over distributed databases: rather than combining probability values, we combine frequency values. Thus, the probability estimation is transparent for distributed or central data sources.

In practice, Structured Query Language (SQL) is often used to access databases. This provides a more user-friendly interface than relational algebra for the user of the database.

This may be achieved by adding two additional clauses to the standard "SELECT" statement used in SQL: an "ASSUMPTION" clause and an "EVIDENCE KEY" clause. These perform the same function as the assumption and evidence key described above. Thus in order to obtain results with associated probabilities, a user would enter a SELECT statement with the following syntax:

```
SELECT <attributes>
FROM <relations>
WHERE <condition>
ASSUMPTION
[OCCURRENCE|INFORMATIVENESS|DISJOINT|INCLUSION|
INDEPENDENCE]
EVIDENCE KEY (<columns>)
```

This SQL statement performs the same function as the BAYES operator in relational algebra described above: it simply provides a different user interface.

The PRA described above has been implemented as part of the probabilistic object-relational HySpirit retrieval framework, as described by T. Rölleke in *"POOL: Probabilistic Object-Oriented Logical Representation and Retrieval of of Complex Objects"*, Shaker Verlag, Aachen, 1999 (Dissertation) and M. Lalmas, T. Rölleke, N. Fuhr "Intelligent hypermedia retrieval" in P. S. Szczepaniak, F. Segovia, and L. A. Zadeh, editors, *Intelligent Exploration of the Web*. Springer-Verlag Group (Physica-Verlag), 2002. The framework has been applied to collections with more than 200,000 retrievable objects where the database had a volume of approximate 2 GB (including indexes). Since the indexing and retrieval strategies are scalable, larger document sources and queries with many terms can be processed using parallelisation strategies.

Thus there is provided a sixth basic operation for a probabilistic relational algebra: the relational Bayes. This has application for probability estimation based on idf, tf, and link-frequency. It will be appreciated that the application of Bayes is not restricted to information retrieval: Bayes is a general operator that exploits frequency information inherent in relations.

With the incorporation of probability estimation into the probabilistic relational paradigm, probability estimation has been lifted to the logical layer of data modelling. In this logical layer, the modelling of complex retrieval tasks that involve document normalisation, document importance, structure of documents, links of documents, user preferences, etc. is flexible, efficient and effective. In addition, database applications such as datawarehousing, data fusion, footprint database selections, and others benefit from the management of uncertain data, and now, with PRA and Bayes, the means for managing uncertainty are available as a generalisation of the standard relational paradigm.

Already PRA without Bayes possesses a high level of integration of database and retrieval technology. The estimation of PRA probabilities was viewed as a short-coming of PRA. Now, with Bayes, the use of PRA for building search applications becomes significantly more efficient, since Bayes is a single and well-defined operator that provides the necessary means for frequency-based and information-theoretic probability estimation.

This allows the application of PRA for probabilistic inference networks (PINs), probabilistic relevance feedback, precision/recall evaluation, and datawarehousing. For PINs, PRA can serve as the logical implementation layer. This is of benefit for PINs, because PINs can then use existing database technology. Probabilistic relevance feedback requires estimation of probabilities from feedback data and aggregation of those probabilities with other knowledge dimensions. Up until now, the probabilistic retrieval model based on relevance feedback had to be implemented in a programming language. Now, the means has been provided to express the model on the layer of PRA. Precision and recall are common evaluation measures and they can be interpreted as conditional probabilities: precision=P(relevant ∧ retrieved | retrieved) and recall=P(relevant ∧ retrieved | relevant). With Bayes available in PRA, the modelling of evaluation on the level of PRA can be investigated. This modelling makes evaluation measures more transparent and complex evaluation measures can be defined and tested. For datawarehousing the application of PRA for achieving a relevance-based ranking of retrieved products, customers, etc. can be investigated. Further, the next generation of PRA embodies probability distributions rather than point probabilities only, and the probability estimation is based on distributions rather than on frequencies only.

Probability aggregation and probability estimation has now been added to the relational paradigm. A "neat" probabilistic relational framework has been achieved for supporting the development of information systems in which a relevance-based ranking of retrieved objects is required. Since the relational model (and the object-relational, of course) is the standard model for data design, the probabilistic relational framework makes retrieval technology widely available. For example, datawarehouses include huge quantities of information which in the past have had no ranking, for example lists of employees, suppliers, customers etc. The possibility of ranking this information can greatly facilitate a user making an informed selection of the best supplier, employee etc for a particular task.

The invention claimed is:
1. A method of estimating probabilities in a relational database, comprising:
  applying a relational algebra operator to the database, the operator acting to:
    identify a list of records in the database, each record containing first and second attribute values;

identify all the second attribute values found in the list of records; and assign a probability to each first attribute value on the basis of the frequency of its occurrence relative to each second attribute value, wherein the probabilities for the first attribute values are normalized so that the sum of the probabilities is 1.

2. A method of estimating probabilities in a relational database, comprising:

applying a relational algebra operator to the database, the operator acting to:

identify a list of records in the database, each record containing first and second attribute values;

identify all the second attribute values found in the list of records; and assign a probability to each first attribute value on the basis of the frequency of its occurrence relative to each second attribute value, wherein the probabilities of the first attribute values are assigned so as to maximize their selectivity, wherein the probability for each first attribute value is proportional to the inverse document frequency of that attribute value relative to the second attribute values, and wherein the inverse document frequency of a first attribute value is defined as the logarithm of the total number of second attribute values divided by the number of second attribute values contained in records also containing the first attribute value.

3. A method of estimating probabilities in a relational database, comprising:

applying a relational algebra operator to the database, the operator acting to:

identify a list of records in the database, each record containing first and second attribute values;

identify all the second attribute values found in the list of records; and assign a probability to each first attribute value on the basis of the frequency of its occurrence relative to each second attribute value, wherein the probabilities for the first attribute values are normalized so that, for each possible second attribute value, the sum of the probabilities of first attribute values is 1.

\* \* \* \* \*